United States Patent [19]

Fujino et al.

[11] Patent Number: 5,315,470
[45] Date of Patent: May 24, 1994

[54] DISK CARTRIDGE WITH CENTERED MAGNETIC PLATE

[75] Inventors: Toyomi Fujino; Hajime Yano, both of Kanagawa, Japan

[73] Assignee: Sony Corporation, Tokyo, Japan

[21] Appl. No.: 871,822

[22] Filed: Apr. 21, 1992

[30] Foreign Application Priority Data

Apr. 25, 1991 [JP] Japan .................................. 3-095061

[51] Int. Cl.[5] .............................................. G11B 23/03
[52] U.S. Cl. ................................................... 360/133
[58] Field of Search .................. 360/133, 98.08, 99.05, 360/99.12; 369/291, 282

[56] References Cited

U.S. PATENT DOCUMENTS

| 4,796,139 | 1/1989 | Faber | 360/133 |
| 4,812,937 | 3/1989 | Nemoto | 360/133 |
| 4,858,050 | 8/1989 | Ashe et al. | 360/133 |
| 5,090,010 | 2/1992 | Takahashi | 360/133 |
| 5,111,446 | 5/1992 | Fujita | 369/291 |

FOREIGN PATENT DOCUMENTS

| 0216708A3 | 4/1987 | European Pat. Off. ... G11B 23/033 |
| 0244132A2 | 4/1987 | European Pat. Off. ..... G11B 23/03 |
| 0348937A3 | 1/1990 | European Pat. Off. ..... G11B 23/03 |
| 2146483A | 4/1985 | United Kingdom ......... G11B 19/20 |

Primary Examiner—A. J. Heinz
Attorney, Agent, or Firm—Philip M. Shaw, Jr.

[57] ABSTRACT

A disk cartridge includes a plate made of a metallic substance held on a counter chucking side of a flange formed in a center portion of a disk. The magnetic plate is housed inside a disk cartridge and has a height set at a dimension greater than the shortest axial dimension between a portion of the cartridge casing opposite the counter chucking surface of the flange and the facing surface of the disk.

22 Claims, 7 Drawing Sheets

DISK CARTRIDGE WITH CENTERED MAGNETIC PLATE

BACKGROUND OF THE INVENTION

1. Field of The Invention

The present invention relates generally to a disk cartridge. Particularly, the present invention relates to a type of disk cartridge which may be applied to an optical or a magneto-optical disk etc., which requires fewer production steps and is stable and reliable for information storage and retrieval applications.

2. Description of The Prior Art

In the various information retrieval and storage media technologies, for example, magnetic, magneto-optical and optical disk media, if dust or other material impinges on a recording surface of the media, errors are apt to occur during reading and/or writing of the information on the disk.

For this reason disk information storage and retrieval media (hereinbelow: disk) are usually housed in a protective cartridge casing. Examples of such disk cartridges are disclosed in U.S. Pat. Nos. 4,797,770 and 4,799,121. According to these disclosures, opposing upper and lower halves of a cartridge casing are joined by screws, ultrasonic welding or the like into a cartridge/shutter assembly. In one of the halves of such disk cartridge assemblies, an opening for a rotary driving means is formed in a substantially center portion thereof for chucking the disk on a turntable of a disk drive.

Further, a shutter protects an opening for a read/write head such as an optical head, for example, of a disk drive which accesses the disk for reading data from and/or writing data to at least one side of the disk. The shutter is generally U-shaped in cross-section and slidably disposed to open and close for exposing and cover the disk surface respectively.

The shutter and the disk cartridge receive therein a rotatably mounted disk, the disk substrate may generally be formed of a polycarbonate such as PMMA (polymethyl methacrylate), glass, or other suitable material for example.

In the case of optical disks, a material with suitable optical characteristics is necessary. On the side opposite that of a transparent optical substrate, a reflective read/write layer and a protective layer for protecting the read/write layer are formed. Such optical disk arrangements are disclosed in U.S. Pat. Nos. 4,787,009 and 4,829,510.

In the above mentioned disclosures, a magnetic plate is provided in a central portion of the disk for coupling with a rotational driving means of the disk drive turntable for simplifying alignment of the disk for read and/or write operations. In optical disk cartridges, this magnetic plate is substantially circular and positioned at a center portion of the disk cartridge. The magnetic plate is joined to the disk substrate with adhesive or is retained in a ring of synthetic resin which is joined to the disk by ultrasonic welding or the like.

In disk loading operations the spindle of a disk drive turntable is aligned with a center of the magnetic portion for correctly positioning the disk axially for read and/or write operations.

In these disk cartridges, a center hole of the magnetic plate decides the surface orientation of the disk and decentering of the disk may occur. Further, even if adhesion is accurately carried out the adhesive and the disk material often have different expansion characteristics when exposed to humidity or temperature variations and warping, due to shrinkage or expansion of the adhesive, for example, which may easily cause read and/or write errors to occur.

Therefore, it has been required to provide a disk cartridge in which decentering of the disk may be prevented to avoid damage to the disk and/or the disk drive.

SUMMARY OF THE INVENTION

It is therefore a principal object of the present invention to overcome the drawbacks of the prior art.

It is a further object of the invention to provide a disk cartridge which can be simply assembled and provide reliable operation.

In order to accomplish the aforementioned and other objects, a disk cartridge according to the present invention comprises a casing formed of first and second halves, the first half having an access opening for allowing driving means to be communicated with the internal space of the disk cartridge, a disk having an axial opening formed substantially in a center portion thereof and having a recess surrounding a periphery of the axial opening, the recess being formed in the direction of the access opening and having an annular bottom flange defining a center opening, the annular bottom flange having a chucking surface facing the exterior of the disk cartridge through the access opening and a counter chucking surface facing an inner surface of the second half of the casing, a magnetic plate provided in the recess, a height of the magnetic plate determined to be greater than a shortest axial distance between one surface of the disk and a facing inner surface of the second half of the casing.

According to another aspect of the present invention, a disk cartridge comprises a casing formed of first and second halves, the first half having an access opening for allowing driving means to be communicated with the internal space of the disk cartridge the second half being provided with a first projecting portion is projected from the inner surface along a predetermined circumference, a disk having an axial opening formed substantially in a center portion thereof and having a recess surrounding a periphery of the axial opening, the recess being formed in the direction of the access opening and having an annular bottom flange defining a center opening, the annular bottom flange having a chucking surface facing the exterior of the disk cartridge through the access opening and a counter chucking surface facing an inner surface of the second half of the casing, the disk further including a second projecting portion along the circumference of the recess in the direction of the second half of the casing, a magnetic plate provided in the recess, a height of the magnetic plate determined to be greater than a shortest axial distance between a surface of the disk and a facing inner surface of one half of the casing.

DESCRIPTION OF THE PREFERRED EMBODIMENT

Figure 1A:
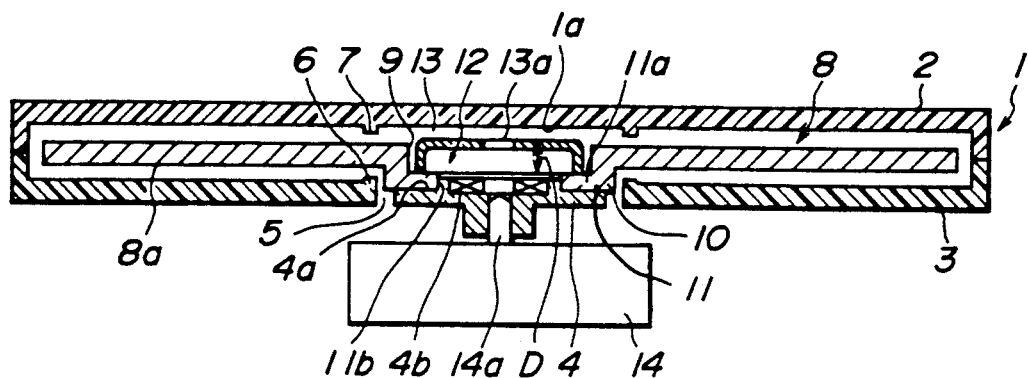
FIG. 1A and B are cross-sectional views of a disk cartridge according to a first embodiment of the invention during engagement and disengagement of disk chucking.

Referring now to the drawings, particularly to FIGS. 1(A) and (B) wherein like parts will be referred to by like numerals, a disk cartridge 1 according to the present invention includes an upper half 2 and a lower half 3. The upper and lower halves 2, 3 may be made of ABS (acrylonitrile butadiene styrene) resin for example. The disk cartridge is accessible via an opening 5 in the lower half 3 by a turntable 4 for rotatably engaging a disk 8 housed within the disk cartridge 1. The disk may be of an optical or magneto-optical type, for example. The opening 5 circumferentially contacts a first (lower) ridge portion 6, which may be formed as an annular ridge portion, and protrudes upwardly from an inner bottom surface of the lower half 3 so as to border the opening 5. A corresponding second (upper) ridge portion 7 is formed downwardly facing from an inner surface of the upper half 2. The first and second ridge portions 6, 7 oppose each other with a gap therebetween for rotatably mounting the disk 8 between the upper and lower halves 2, 3.

Further, both upper and lower halves 2, 3, have an elongated opening formed in the circumferential direction in the vicinity of a disc axis portion (not shown in the drawings) for admitting an optical head (not shown) of a disc drive for reading data from the disk 8.

For allowing recording and reading data on the disk 8, a center portion thereof is provided with a central opening 9 in the axial direction of the disk 8. The central opening 9 is surrounded circumferentially by a wall portion 10 which extends downward toward the opening 5 provided in the lower half 3. The dimension of the wall portion 10 is such that a part thereof is located in the opening 5. An upper part of the wall portion 10 circumferentially borders a data read/write surface $8a$ of the disk 8. Parallel to the surface $8a$ of the disk extending inwardly at an elevation corresponding to the lower inner surface of the wall portion 10 is an annular counter chucking surface $11a$ defining an inner circumferential opening $11b$. The wall portion 10, the chucking surface $11a$, and the inner circumferential portion $11b$ collectively define a flange 11 formed coaxially to the disk center. A recess 12 defines the inner circumference of the flange.

Further, the diameter of the wall portion 10 is determined close to, but smaller than, a diameter of the opening 5, while the diameter of the inner circumferential portion $11b$ is determined smaller than the diameter of the recess 12. The inner circumferential portion $11b$ serves to center the disk 8 relative the turntable 4 during disk operation.

The recess 12 contains a magnetic plate 13 having an opening $13a$ through the center thereof. The magnetic plate 13 may be of stamped metal, for example, and have a substantially inverted U-shaped cross-section and be generally circular in plan view. A height D of the magnetic plate 13 is chosen to be at a dimension larger than the shortest axial distance between the upper horizontal surface of the disk 8 and an upper surface $1a$ of the upper, inside half 2. The diameter of the magnetic plate 13 is chosen to be larger than the diameter of the opening $11b$.

Figure 1B:
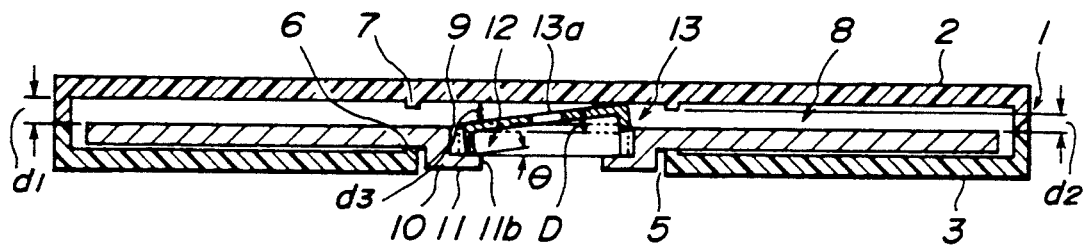

Referring to FIG. 1(B), a distance $d_1$ is the vertical distance between the upper horizontal surface of the disk 8 and the upper, inside surface $1a$ of the upper half 2. An angle $\theta$ represents an angle formed between the chucking surface $11a$ and the bottom of the magnetic plate 13 at a maximum degree of deflection of the magnetic plate within the cartridge before the magnetic plate 13 overlaps the periphery of the recess 12.

In this condition, according to the present invention, a relation between the dimensions of the disk components may be shown by the following equation:

$$D \geq D \cdot \cos \theta > d_4 \qquad (1)$$

Furthermore, a distance $d_2$ is the vertical distance between the upper horizontal surface of the disk 8 and the lowermost end of the second ridge portion 7 projected from the lower surface of the upper half 2 and a distance $d_3$ is that between an upper surface of the magnetic plate 13 and the inner surface of the upper half 2. The distances $d_2$ and $d_3$ are established such that in a non-chucking condition of the disk the following condition should be satisfied:

$$d_3 > d_2 \qquad (2)$$

Figure 2:
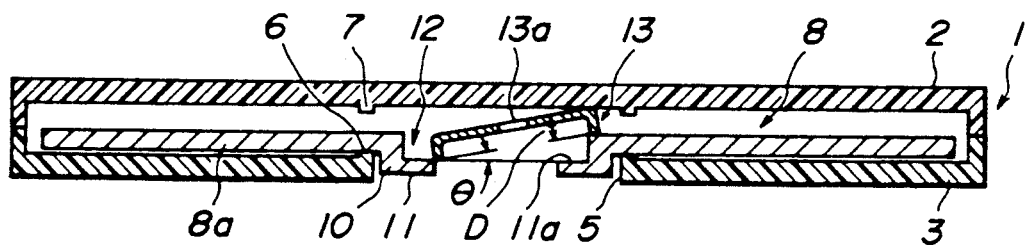
FIG. 2 is a cross-sectional view of a disk cartridge in which a magnetic plate portion is displaced.

According to the above, a relation:

$$D \cdot \cos \theta < d_1 \qquad (3)$$

is prevented, for avoiding such a situation as shown in FIG. 2, wherein the magnetic plate overlaps a periphery of the hollow portion and may become caught between the upper surface of the disk and in the inner surface of the upper half 2.

Numeral 14 refers to a spindle motor of the turntable 4. A rotatable output axis $14a$ protrudes from the spindle motor 14. An adsorbing surface $4a$ of the turntable 4 supports a lower side of the flange 11 in the disk chucked position (FIG. 1(A)) such that the chucking surface $11a$ is interposed between the adsorbing surface $4a$ and the magnetic plate 13. A magnet $4b$ is adhered proximate the output axis $14a$ of the spindle motor 14. The magnet $4b$ may be an annular, donut-shaped, magnet mounted concentrically to the output axis $14a$, for example.

According to the above, a disk cartridge according to the present invention may be simply and accurately assembled with high reliability, further, an adhesion step for joining the magnetic plate 13 to the disk 8 is not carried out.

Figure 3A:
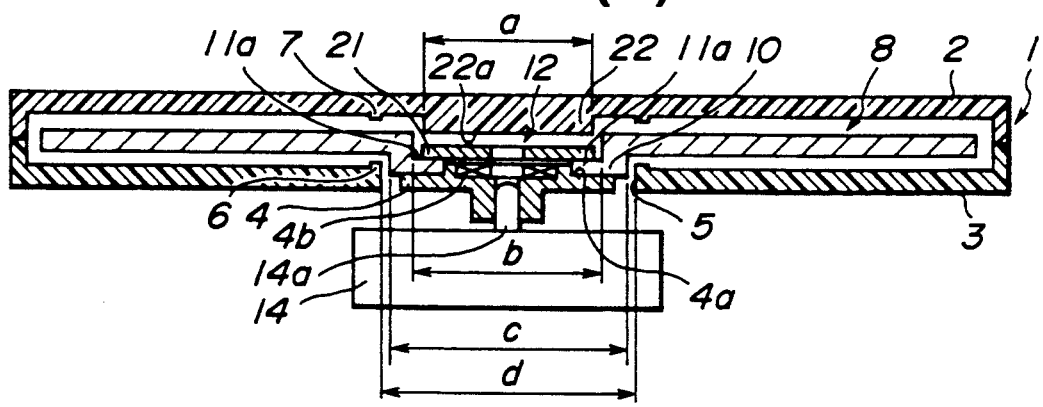
FIG. 3A and B show cross-sectional views of a disk cartridge during engagement and disengagement of disk chucking according to a second embodiment of the invention.
Figure 3B:
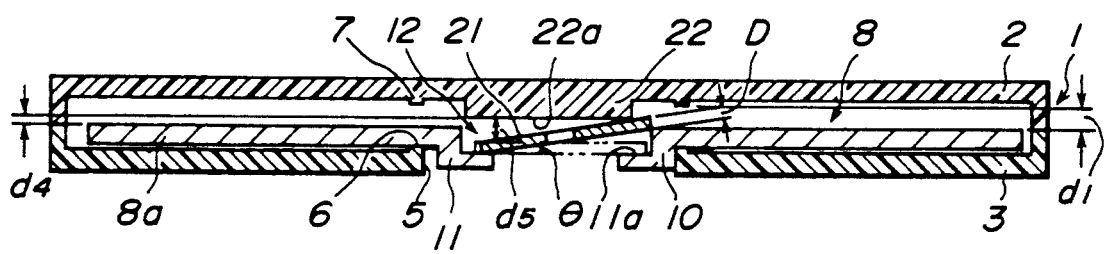

Hereinbelow, a second embodiment according to the present invention will be described with reference to FIGS. 3(A) and 3(B).

In the previous embodiment, a height of the magnetic plate 13 within the recess 12 is comparatively large. However, the arrangement of the second embodiment of the present invention is not limited to the above limitation. An arrangement as shown in FIGS. 3A and 3B may also be preferably embodied. According to this arrangement, a disk-like magnetic plate 21, which is substantially thinner than the magnetic plate 13 of the previous embodiment, is employed. In this case, an inner surface of the upper half 2 in a center portion thereof, opposing the chucking arrangement and the magnetic plate 21, is provided with a projecting portion 22. That is to say, a central portion of the upper half wall opposing the disk center is made thicker than other portions of the upper half. The thickness (height) D of the magnetic plate 21 is such that an angle $\theta$ represents an angle formed between the counter chucking surface 11a and a contacting portion of the magnetic plate 21 when the magnetic plate 21 is at a maximum degree of deflection within the cartridge, such as just before an upper circumferential edge of the magnetic plate 13 overlaps the periphery of the recess 12. The space between the upper surface of the disk 8 and the surface 22a of the projecting portion 22 is $d_4$. Thus, according to the above-described structure, the following relation is satisfied:

$$D \geq D \cdot \cos \theta > d_4 \qquad (4).$$

Further, assuming a diameter of the projecting portion 22 is a, a diameter of the recess 12 formed in the disk center is b, an outer diameter of the wall portion 10 is c, and the diameter of the chucking opening 5 formed in the lower half is d, interference between the projecting portion 22 and the disk 8 can be prevented by maintaining the following relations:

$$b - a > d - c \qquad (5)$$

and in addition, a relation between the distance $d_1$, between the disk and the second ridge portion 7, and a distance $d_5$, between the top of the magnetic plate 21 and the surface 22a of the projecting portion 22 in a non-chucking state of the disk is established such that:

$$d_5 \geq d_1 \qquad (6).$$

According to the above arrangement, the same advantages as the first embodiment may be obtained.

Hereinbelow, third, fourth and fifth embodiments of the present invention will be described with reference to FIGS. 4(A)–6(B).

Figure 4A:
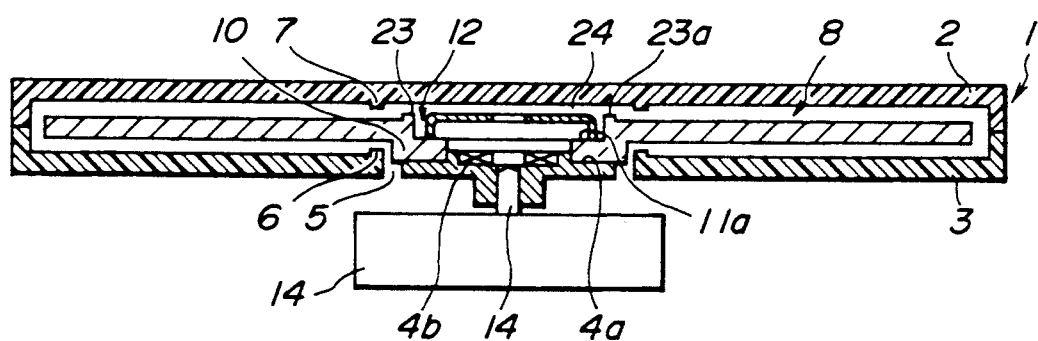
FIG. 4A and B show cross-sectional views of a disk cartridge during engagement and disengagement of disk chucking according to a third embodiment of the invention.
Figure 4B:
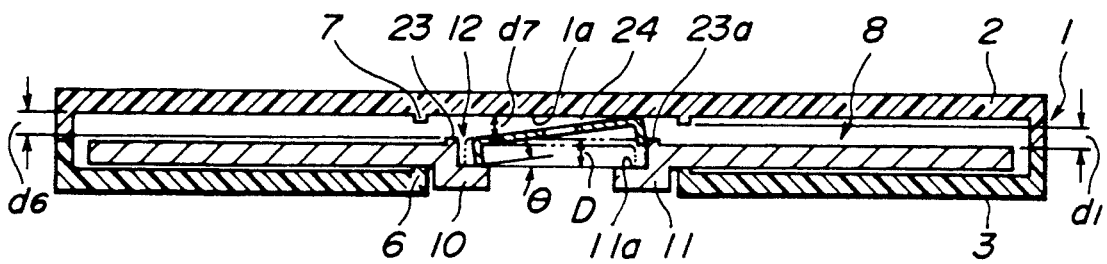

Referring to FIGS. 4(A) and 4(B), a recess 12 holding a magnetic plate 24 is provided similarly to the first embodiment. Further, a third ridge portion 23 is arranged on the disk 8 around the periphery of the recess 12. In this case, assuming an angle formed by the lower end face of the magnetic plate 24 and the counter chucking surface 11a to be $\theta$, a dimension between the disk 8 and the second ridge portion 7 to be $d_1$, the shortest axial dimension between a face 23a of the third ridge portion 23 and the surface 1a of the upper half to be $d_6$, a dimension between the top of the magnetic plate 24 and the opposing inner surface of the upper half to be $d_7$ and a height of the magnetic plate to be D, as shown in FIG. 4(B) the following relation is established:

$$D \cdot \cos \theta > d_6, \ d_6 < d_1, \ d_7 < d_1 \qquad (7).$$

Figure 5A:
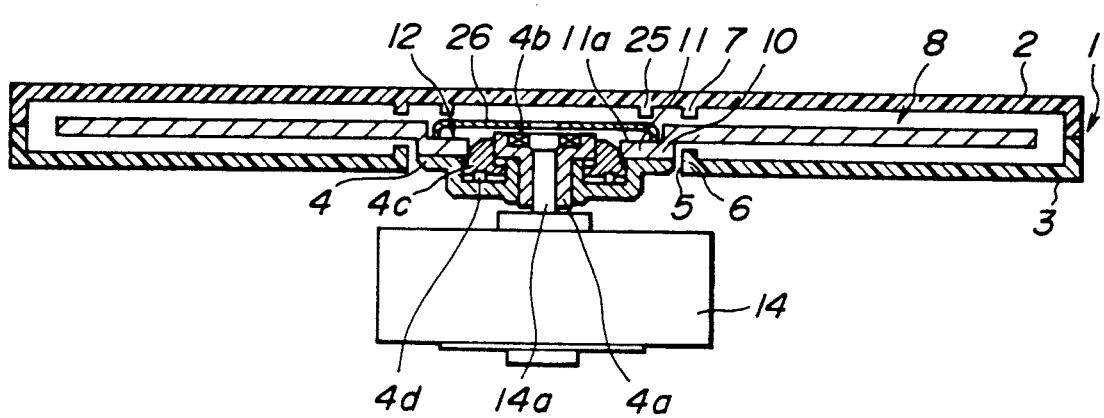
FIG. 5A, B show cross-sectional views of a disk cartridge according to a fourth embodiment of the invention during engagement and disengagement of disk chucking.
Figure 5B:
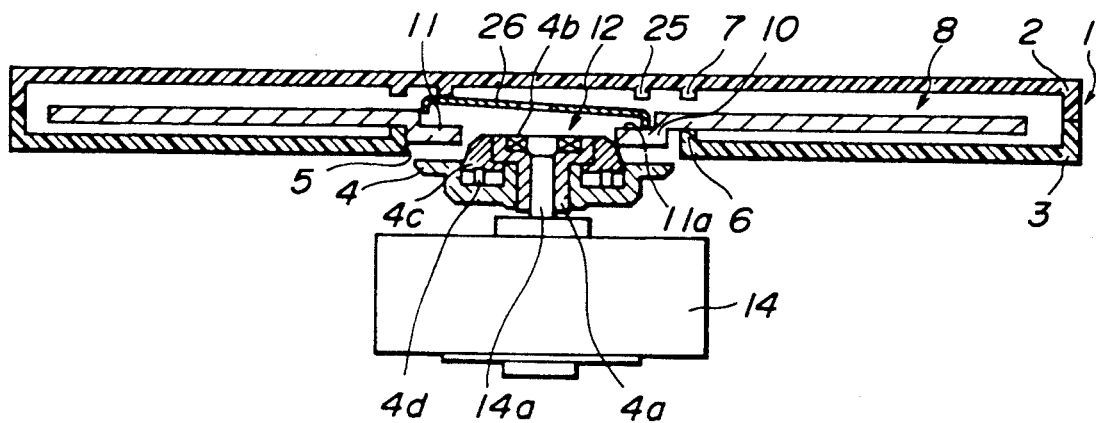

FIGS. 5(A) and 5(B) show a fourth embodiment of the invention in which a fourth ridge portion 25 is arranged on the side of an inner periphery of the second ridge portion 7 in place of the third ridge portion of the previous embodiment. A height of the fourth ridge portion 25 is set to be identical to that of the second ridge portion 7. A magnetic plate 26 is provided similarly to the previous embodiments.

A turntable for use with the disk structure as described above consists of a shank 4a mounted to an output shaft 14a of a spindle motor 14, a magnet 4b for attracting the magnetic plate of the disk cartridge and a centering member 4c for centering the disk around the magnet 4b, and a spring 4d for biasing the centering member 4c in an axial direction of the output shaft 14a.

Figure 6A:
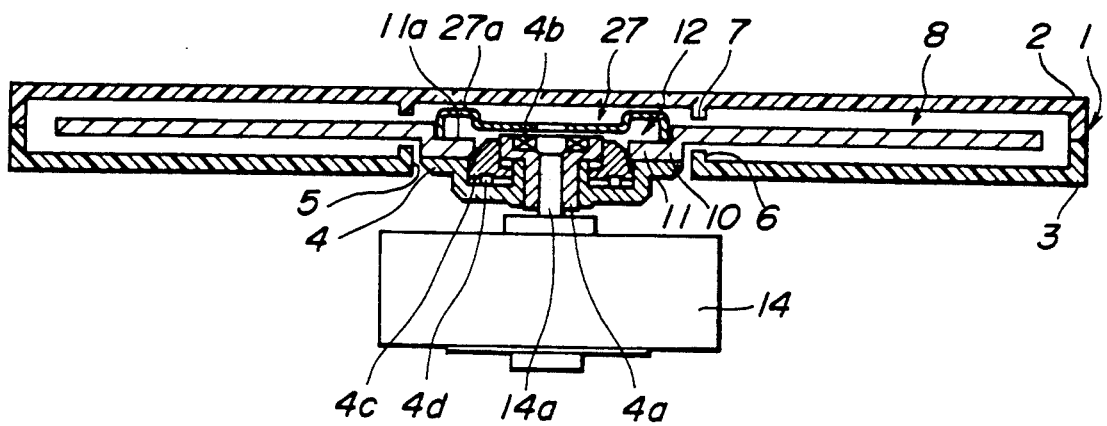
FIG. 6A, B show cross-sectional views of a disk cartridge according to a fifth embodiment of the invention during engagement and disengagement of disk chucking.
Figure 6B:
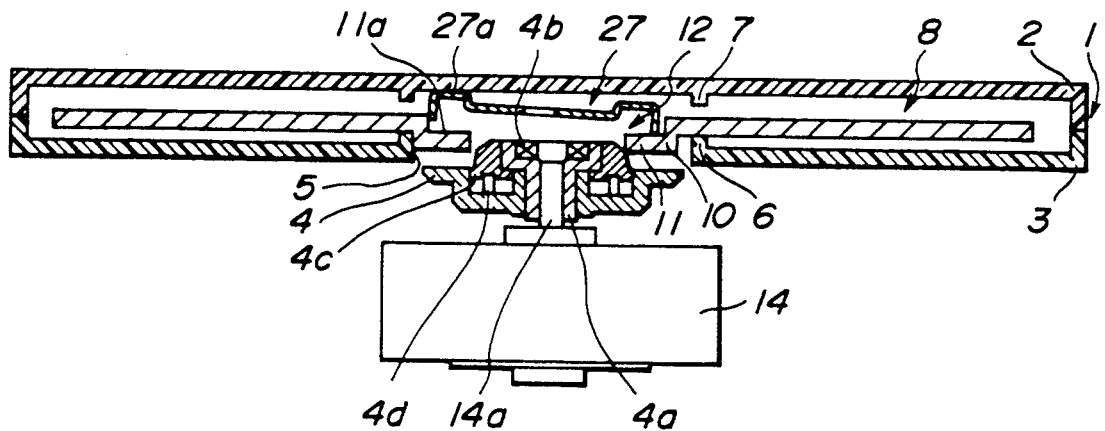

FIGS. 6(A) and 6(B) show a fourth embodiment of the invention wherein a fifth ridge portion 27a is formed at the circumference of the magnetic plate 27 instead of the fourth ridge portion 25 of the third embodiment. The magnetic plate may be be formed of a magnetic material by two stage drawing, for example.

Figure 7A:
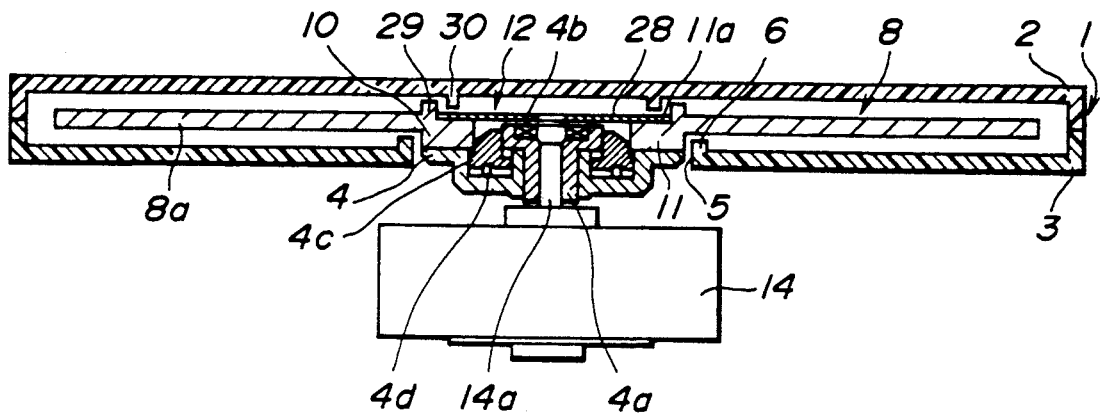
FIG. 7A, B show cross-sectional views of a disk cartridge according to a sixth embodiment of the invention during engagement and disengagement of disk chucking.
Figure 7B:
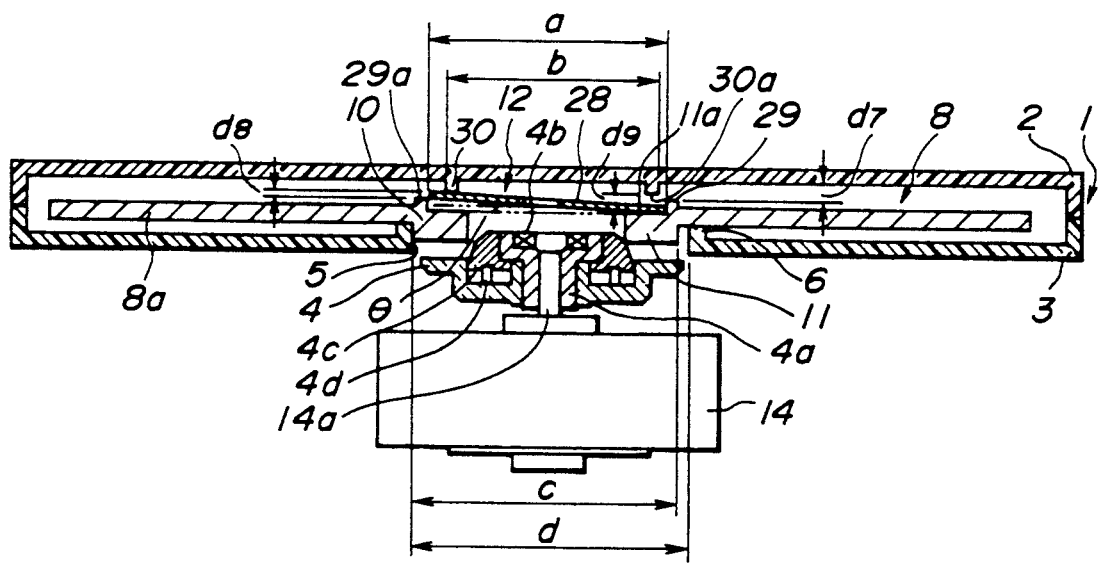

Further, though the fourth embodiment utilizes a dish shaped magnetic plate 27, the invention may also be realized with a flat plate. Referring to FIGS. 7(A) and 7(B), a sixth ridge portion 29 is formed similarly to the ridge portion 23 of the second embodiment. That is, the sixth ridge portion 29 is formed at the circumference of the recess 12 so as to protrude above the surface of the disk 8 facing the upper half 2 of the disk cartridge. Further, a seventh ridge portion 30 is arranged on the inner face of the upper half 2 with a circumference smaller than that of the sixth ridge 29. In case of the above arrangement, to prevent interference in disk operation, the following relations should be satisfied. Assuming an angle between the face 11a of the flange 11 and the lower face of the magnetic plate 28 to be $\theta$ at a position just before the magnetic plate 28 overlaps the sixth ridge portion 29 (FIG. 7(B)), and assuming the shortest axial dimension between a point on the face 29a of the sixth ridge portion 29 and a point on the face 30a of the seventh ridge portion 30 to be $d_8$ in the same, non-chucking state of the disk, the height D of the magnetic disk is chosen to satisfy the following relation:

$$D \geq D \cdot \cos \theta < d_8 \qquad (8)$$

however, assuming an outer diameter of the seventh ridge portion 30 to be $\alpha$, an inner diameter of the recess 12 to be $\beta$, an outer diameter of the wall portion 10 to be $\gamma$, and an inner diameter of the opening 5 to be $\delta$, the following formula should be satisfied so as to prevent interference between the disk 8 and the seventh ridge portion 30:

$$\beta - \alpha > \delta - \gamma \qquad (9).$$

and, assuming a dimension between the magnetic plate 28 and the seventh ridge portion 30 to be $d_9$ in the non-chucking state of the disk 8, the following formula should be satisfied to prevent interference of the magnetic plate 28 and the seventh ridge portion 30:

$$d_8 \geqq d_9 \tag{10}$$

Figure 8A:
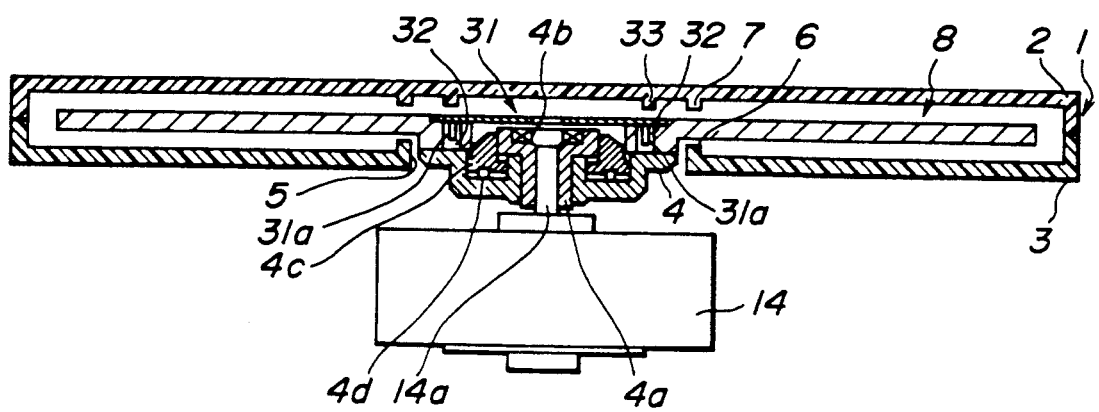
FIG. 8A, B show cross-sectional views of a disk cartridge according to a seventh embodiment of the invention during engagement and disengagement of disk chucking.
Figure 8B:
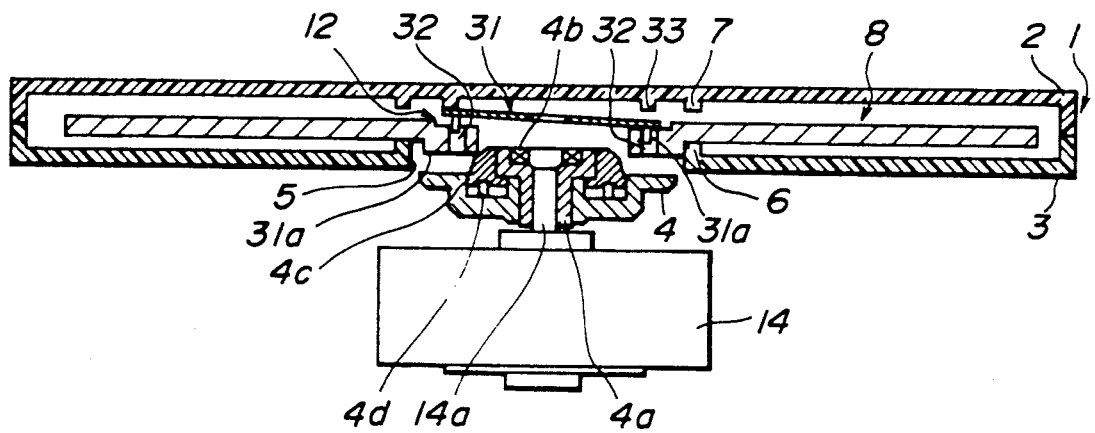
Figure 9:
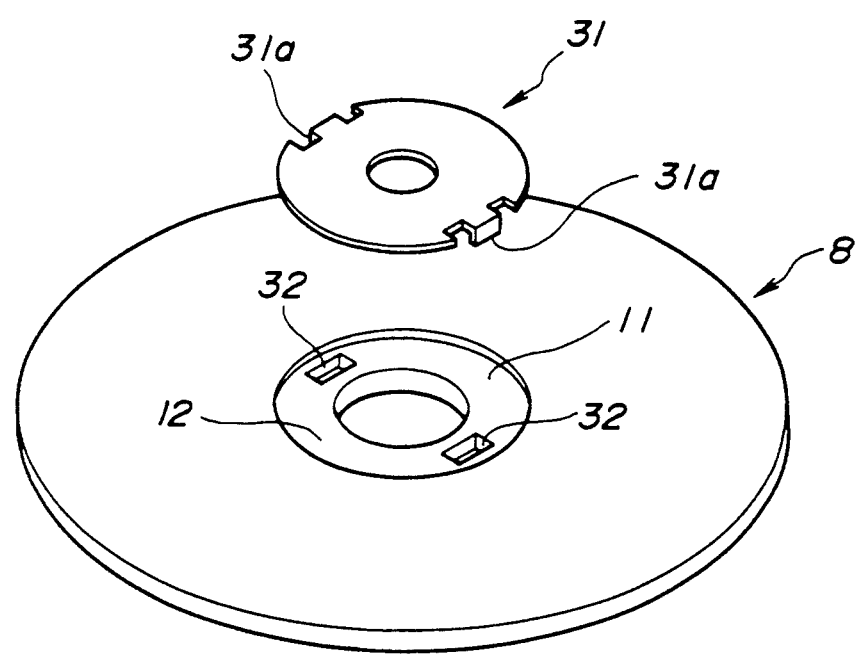
FIG. 9 is a perspective view of the disk and magnetic plate of FIG. 8.

In addition, according to the present invention, referring to FIGS. 8(A) and (B), if a magnetic plate 31 is utilized, having a clip 31a for hooking at an outer periphery thereof, it is possible to prevent the magnetic plate 31a from overlapping the opening periphery of the recess 12. In this case, referring to FIG. 9, an engagement recess 32 is formed in the flange surface 11a opposing the clip 31a and an eighth ridge portion 33. The engagement recess is of a diameter smaller than that of the second ridge portion 7.

According to the above arrangement a disk cartridge assembly according to the present invention may be easily and quickly assembled for reliable operation. Since the magnetic plate is held on the side of the flange 11 opposite the chucking side of the disk 8 within the cartridge housing and the height of the magnetic plate is determined at a dimension greater than the shortest axial dimension between a portion opposite the counter chucking side of the flange, assembly can be simplified and costs reduced.

Also, according to the structure of the present invention, since no step of bonding the disk to the magnetic plate is carried out, even in the presence of humidity and temperature variations the disk cartridge of the invention will remain stable and disk positioning will not alter. Thus, the optical properties of the disk are not compromised.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A disk cartridge comprising:
   a casing formed of first and second halves, said first half having an access opening for allowing driving means to be communicated with an internal space of said disk cartridge;
   a disk having an axial opening formed substantially in a center portion thereof and having a recess surrounding a periphery of said axial opening, said recess being formed to depend from one planar surface of the disk toward a second planar surface of the disk which is parallel to the first planar surface and having an annular bottom flange which surrounds the axial opening, said annular bottom flange having a chucking surface facing the exterior of said disk cartridge through said access opening and a counter chucking surface facing the internal space of said disk cartridge;
   a magnetic plate provided in said recess, a height of said magnetic plate being greater than a shortest axial distance between said disk and an inner surface of said second half of said casing which opposes the recess.

2. A disk cartridge as set forth in claim 1, wherein $d_1$ represents a shortest axial distance between said one planar surface of the disk and said inner surface of said second half of said casing, $\theta$ represents an angle formed between said counter chucking surface of said annular bottom flange of said recess and the bottom of said magnetic plate at a degree of deflection of the magnetic plate within the cartridge casing just before a condition at which a circumference of said magnetic plate overlaps the periphery of said recess, and D represents said height of said magnetic plate wherein a relation between the above is as follows:

$$D \geqq D \cdot \cos \theta > d_1.$$

3. A disk cartridge as set forth in claim 1, wherein a first projecting portion is projected from the inner surface of said second half of said casing such that $d_2$ represents a shortest axial distance between said one planar surface of the disk and said first projecting portion and $d_3$ represents the shortest distance between the magnetic plate and the inner surface of said second half of said casing, wherein said distances $d_2$ and $d_3$, in a non-chucking condition of the disk, satisfy the relationship:

$$d_3 > d_2.$$

4. A disk cartridge as set forth in claim 3, wherein said first projecting portion is of annular shape concentric with said recess and of a diameter larger than that of said recess.

5. A disk cartridge as set forth in claim 4, further including a second projecting portion projected from said inner surface of said second half of said casing, said second projecting portion being circumferentially smaller than said magnetic plate and a projected dimension of said first and second projecting portions is the same.

6. A disk cartridge as set forth in claim 3, wherein said first projecting portion comprises a series of elongate projections set along a predetermined circumference.

7. A disk cartridge as set forth in claim 3, wherein said first projecting portion comprises at least one arc shaped projection formed along a predetermined circumference.

8. A disk cartridge as set forth in claim 3, wherein a central portion of said inner surface of said second half of said casing is made thicker than at other portions of the upper casing so as to form a second projecting portion projecting into the internal space of said disk cartridge toward said magnetic plate, $\theta$ represents an angle formed between said counter chucking surface of said annular bottom flange of said recess and the bottom of said magnetic plate at a degree of deflection of the magnetic plate within the cartridge casing just before a condition at which a circumference of said magnetic plate overlaps the periphery of said recess, and $d_4$ represents a shortest axial distance between the disk and the second projecting portion, wherein the following relation is satisfied:

$$D \geqq D \cdot \cos \theta > d_4.$$

9. A disk cartridge as set forth in claim 8, wherein a diameter of said second projecting portion is a, an inner diameter of the recess formed in the disk center is b, an outer diameter of the recess is c, and a diameter of the access opening formed in one half of said casing is d, so as to maintain the following relation:

$$b - a > d - c.$$

10. A disk cartridge as set forth in claim 8, wherein a relation between said distance $d_1$ and a shortest distance $d_5$ between said second projecting portion and said magnetic plate, in a non-chucking state of the disk, is:

$$d_5 \geq d_1.$$

11. A disk cartridge as set forth in claim 8, wherein said second projecting portion is circular and concentric to said recess.

12. A disk cartridge as set forth in claim 3, wherein said first projecting portion is an annular projection formed concentrically to the axial opening in said disk.

13. A disk cartridge as set forth in claim 3, wherein said magnetic plate includes a raised annular portion around a circumference thereof.

14. A disk cartridge as set forth in claim 13, wherein said raised annular portion of said magnetic plate has a height equal to a height of said first projecting portion.

15. A disk cartridge as set forth in claim 1, wherein a first projecting portion is formed at a circumference of the recess so as to project above the surface of the disk and a second projecting portion is formed on said inner surface of said second half of said casing with a circumference smaller than that of said first projecting portion, $\theta$ represents an angle formed between said counter chucking surface of said annular bottom flange of said recess and the bottom of said magnetic plate at a degree of deflection of the magnetic plate within the cartridge casing just before a condition at which a circumference of said magnetic plate overlaps the periphery of said first projecting portion, and, a shortest axial distance between the first projecting portion and the seventh projecting portion is represented by $d_8$ in a non-chucking state of the disk, the height D of the magnetic disk satisfies the following relation:

$$D \geq D \cdot \cos \theta > d_8.$$

16. A disk cartridge as set forth in claim 15, wherein an outer diameter of the second projecting portion is $\alpha$, an inner diameter of the recess is $\beta$, an outer diameter of the recess is $\gamma$, and an inner diameter of said access opening in said casing is $\delta$ wherein the following relation is satisfied:

$$\beta - \alpha > \delta - \gamma.$$

17. A disk cartridge as set forth in claim 15, wherein, assuming a dimension between the magnetic plate and the second projecting portion is represented by $d_9$, in the non-chucking state of the disk, the following relation is satisfied:

$$d_8 \geq d_9.$$

18. A disk cartridge as set forth in claim 1, wherein said magnetic plate is provided with a clip portion received for engagement in an engagement recess provided in said annular bottom flange.

19. A disk cartridge comprising:

a casing formed of first and second halves, said first half having an access opening for allowing driving means to be communicated with an internal space of said disk cartridge and said second half having a first projecting portion projected from an inner surface of said second half which opposes said first half, along a predetermined circumference;

a disk having an axial opening formed substantially in a center portion thereof and having a recess surrounding a periphery of said axial opening, said recess being formed to depend from one planar surface of the disk toward a second planar surface of the disk which is parallel to the first planar surface and having an annular bottom flange which surrounds the axial opening, said annular bottom flange having a chucking surface facing the exterior of said disk cartridge through said access opening and a counter chucking surface facing the internal space of said disk cartridge, said disk further having a second projecting portion projected along a circumference of said recess toward said second half of said casing;

a magnetic plate provided in said recess, a height of said magnetic plate being greater than a shortest axial distance between said disk and an inner surface of said second half of said casing which opposes the recess.

20. A disk cartridge as set forth in claim 19, wherein $d_1$ represents a shortest axial distance between said one planar surface of the disk and said inner surface of said second half of said casing, $\theta$ represents an angle formed between said counter chucking surface of said annular bottom flange of said recess and the bottom of said magnetic plate at a degree of deflection of the magnetic plate within the cartridge casing just before a condition at which a circumference of said magnetic plate overlaps the periphery of said second projecting portion, and D represents said height of said magnetic plate wherein a relation between the above is as follows:

$$D \geq D \cdot \cos \theta > d_1.$$

21. A disk cartridge as set forth in claim 20, wherein a shortest axial dimension between of the second projecting portion and the inner surface of the facing half of said casing is a distance $d_6$, a dimension between said inner surface of said second half of said casing and said magnetic plate being a distance $d_7$, and wherein the following relation is established:

$$D \cdot \cos \theta > d_6, \quad d_6 < d_1, \quad d_7 < d_1.$$

22. A disk cartridge as set forth in claim 19, wherein said magnetic plate is provided with a clip portion for engagement in an engagement recess provided in said annular bottom flange.

* * * * *